Patented Dec. 21, 1943

2,337,040

UNITED STATES PATENT OFFICE 2,337,040

HEAT-TREATED ROSIN SIZE

Edmund A. Georgi, Wilmington, and Arthur L. Osterhof, Newark, Del., assignors to Hercules Powder Company, Wilmington, Del., a corporation of Delaware No Drawing. Application October 6, 1942, Serial No. 460,984

9 Claims. (Cl. 106—218)

This invention relates to improved rosin sizes and in particular concerns rosin sizes prepared from wood rosin which has been heat-treated prior to neutralization.

Heretofore, rosin sizes have been prepared by reacting rosin, which may or may not have been treated in any of a number of known ways to remove the color bodies therefrom, with an alkali, whereby at least a part of the abietic and other rosin acids present in the rosin are converted to their water-soluble alkali-metal salts.

The paper-making art has, for many years, employed aqueous solutions or dispersions of the alkali-metal salts of rosin almost exclusively for sizing purposes. More recently, however, rosin size dispersions having a high-free rosin content have been finding favor, because of their improved sizing efficiency and substantial manufacturing economies. Although a number of sizing compositions of this general type have been commerically used, those prepared from wood rosin have the disadvantage of tending to deposit a crystalline product during storage or upon dilution with water. This crystalline product known in the art as "3:1 salt" is a water-insoluble double salt consisting of three molecules of abietic acid and one molecule of an alkali-metal abietate, and its formation during the preparation of size emulsions and in the sizing operation is a source of great inconvenience to the paper-maker. Furthermore, these rosin size dispersions exhibit a tendency to form a great deal of foam on the paper machine. Foaming is objectionable as it causes paper to have a poor structure and also interferes with the efficient operation of the machine.

Now, in accordance with this invention, we have found that the tendency for high-free rosin sizes to precipitate 3:1 salt during storage and upon dilution with water may be substantially reduced by subjecting wood rosin to a heat-treatment prior to the neutralization reaction. The heat-treatment, however, should be carried out in such a manner that the rosin retains its crystallizability, since wood rosin which has been heat-treated to an extent sufficient to destroy its crystallizability contains an undesirably high proportion of rosin oils. Such oils contain highly corrosive constituents and are lacking in sizing value, and when present in sizes used in paper making may be the cause of surface imperfections on the paper web. The sizes prepared according to the invention, however, contain substantially none of the undesirable rosin oils and at the same time are substantially free from 3:1 salt formation. They have a further advantage in that their tendency to foam during paper-making operations is considerably less than that of sizes prepared from rosin which has not been heat-treated. Thus, the process of this invention involves the method of making a rosin size containing from about 65 to about 92% of free rosin, from about 7 to about 34% of rosin soap, and from about 1 to about 25% of a protective colloid, which rosin comprises wood rosin which has been heat-treated at a temperature between about 250° C. and about 350° C. for from about 5 minutes to about 5 hours, said heat treatment being sufficient to reduce substantially the tendency of the rosin to form 3:1 salt upon subsequent neutralization but insufficient to destroy its crystallizability. By practicing this method a new and improved high free rosin size is produced which is characterized by a substantially reduced tendency of the rosin to form 3:1 salt upon subsequent storage or dilution, and a materially reduced tendency to foam during the paper making operation.

Now having indicated the nature and purpose of this invention, the following example will illustrate the invention. It is to be understood, however, that such example is presented merely as illustrative of the invention and is not to be construed as limiting the same. In the example, the ingredients are given in parts by weight, unless otherwise indicated.

EXAMPLE 1

1600 parts of wood rosin which had been heat-treated at 300° C. for a period of 30 minutes were placed in a jacketed mixing kettle, and when heated to a temperature of 120–140° C., the rosin was treated, with agitation, with 172 parts of a 25% caustic soda solution, and the temperature of the mixture adjusted to 90° C.

Separately, 64 parts of casein were soaked for 10 minutes in 320 parts of water at 35° C., and then treated with 5.2 parts of 25% caustic soda solution, and agitated until a homogeneous dispersion resulted while the mixture was maintained at a temperature of 35° C.

The casein dispersion was then added to the rosin mixture with agitation for a period of 15 minutes and the temperature of the material was adjusted to 75–78° C. The mixture was then diluted, while being agitated, with 2070 parts of water warmed to 30° C. The resulting rosin size dispersion contained 75% free rosin, 21% rosin soap and 4% casein.

When this rosin size dispersion was tested for rosin crystallization, samples of the rosin size were placed in a 70° C. oven for a period of a week. The samples were observed and shaken every day during that time. At the end of the test period, the samples were screened through a 200 mesh screen. No crystallization was apparent.

The foaming tendencies of the rosin size were compared with a rosin size identical with that of Example 1, except that the rosin used had not been heat-treated. 3% emulsions were prepared by diluting 9.43 parts of the rosin size made from rosin which had been heat-treated and 8.8 parts of rosin size made from rosin which had not been heat-treated, to 100 parts respectively with water. The procedure consisted of adding 10 cc. of 3% size emulsion to 500 cc. of hard water at 78° F., mixing, adding 3.5 cc. of alum solution (120 grams of commercial aluminum sulfate per liter) and mixing again. Immediately, this alum size floc was placed in a foam tester and agitated for 5 minutes at 2000 revolutions per minute, at the end of which time, the volume of foam formed was read in tenths of inches of height (units of foam). Two methods of alum addition were employed, namely, in one case it was added at the rate of 3.5 cc. in 4–5 seconds, and in the other case dropwise or at the rate of 3.5 cc. in 60–70 seconds.

It will be noted in the following table that a substantial reduction in foaming tendencies has resulted under comparable conditions from the rosin size made from wood rosin which has been heat-treated according to the process of this invention.

TABLE 1

*Comparison of foaming tendencies of rosin sizes made from wood rosin which has been heat-treated and rosin size made from rosin which has not been heat-treated*

| Kind of rosin used | Rate of alum addition | pH of floc | Units of foam |
|---|---|---|---|
| Heat-treated wood | Slow | 4.6 | 4 |
| Do | do | 4.5 | 6 |
| Do | Fast | 4.5 | 7 |
| Do | do | 4.6 | 8 |
| Rosin which had not been heat-treated | Slow | 4.6 | 12 |
| Do | Fast | 4.5 | 21 |
| Do | do | 4.6 | 29 |

As hereinbefore mentioned, the new and improved sizes provided by the present invention are prepared by at least partially neutralizing wood rosin which has been heat-treated to an extent sufficient to effect a substantial reduction in its tendency to form 3:1 salt upon subsequent partial neutralization but insufficient to destroy its crystallizability. Such heat-treatment may be carried out batch-wise simply by heating wood rosin, which has preferably but not necessarily been refined, for example, by selective solvent extraction, at a temperature below the decomposition temperature, e. g., between about 250° C. and about 350° C. and preferably under non-oxidizing conditions, until the desired change in the rosin has taken place.

More preferably, however, the heat-treatment is carried out continuously as described in detail in the co-pending application of Henry A. Johnstone, Serial No. 356,958, filed September 16, 1940. Such method consists essentially in passing the rosin, in molten condition and in heat-exchange relationship with the hot product, through a reaction vessel where it is subjected to a temperature between about 250° C. and about 350° C., preferably between about 280° C. and about 325° C., and under non-oxidizing conditions. The reaction vessel is vented to provide exit for any gaseous and highly volatile products which may be formed, but it will be noted that the heating is accomplished in such manner that substantially no distillation of the rosin takes place.

The time required to effect the desired changes in the rosin varies with the temperature at which the heat-treatment is carried out as well as with the particular type and grade of rosin employed. Ordinarily, however, it will be found that from 5 minutes treatment at 350° C. to about 5 hours treatment at 250° C. will be sufficient to reduce substantially the 3:1 salt-forming tendency of the rosin but insufficient to destroy its crystallizability. The extent of the heat-treatment may also be controlled by determining certain physical and chemical properties of the finished product. Thus, the extent of the heat-treatment may be measured by determining the unneutralizable content of the product, since the proportion of unneutralizables invariably increases during the heat-treatment. Similarly, the extent of the heat-treatment may be followed by following the change in the specific rotation of the rosin. Rosin which has been heat-treated until its specific optical rotation in the solid state has been raised from a negative or low positive value to a value above about +5° is substantially free from a tendency to form 3:1 salt, whereas rosin which has been heat-treated until its specific rotation has been raised to above +20° will have lost its crystallizability. Accordingly, it will be seen that the rosins which are suitable for use according to the invention are those whose solid specific rotation has been increased to a value between about +5° and +20°, preferably between about +10° and about +15°, by heating at temperatures between about 250° C. and about 350° C.

The rosin size produced by the process of this invention is a high free rosin size containing from about 65 to about 92% by weight of free rosin, from about 7 to about 34% by weight of rosin soap, and from about 1 to 25% of a protective colloid based on the weight of the rosin, characterized by its substantially reduced tendency to form 3:1 salts upon storage or dilution, and its materially reduced tendency to foam. Thus, the disadvantages which have retarded the commercial growth of high-free rosin sizes have now been overcome.

This application is a continuation-in-part of our copending application, Serial No. 357,006, filed September 16, 1940.

What I claim and desire to protect by Letters Patent is:

1. A rosin size containing from about 65 to about 92% by weight of free rosin, from about 7 to about 34% by weight of rosin soap, and from about 1 to about 25% of a protective colloid, said rosin comprising wood rosin which has been heat-treated at a temperature between about 250° C. and about 350° C. for from about 5 minutes to about 5 hours, said heat treatment being sufficient to reduce substantially the tendency of the rosin to form 3:1 salt upon subsequent saponification, but insufficient to destroy its crystallizability.

2. A rosin size containing from about 65 to about 92 by weight of free rosin, from about 7 to about 34% by weight of rosin soap, and from about 1 to about 25% of a protective colloid, said rosin comprising wood rosin whose specific rotation in the solid state has been raised to a value between about +5° and about +20° as the result of having been heated at a temperature between about 250° C. and about 350° C. for from about 5 minutes to about 5 hours, said heat treatment being sufficient to reduce substantially the tendency of the rosin to form 3:1 salt upon subsequent saponification, but insufficient to destroy its crystallizability.

3. A rosin size containing from about 65 to about 92% by weight of free rosin, from about 7 to about 34% by weight of rosin soap, and from about 1 to about 25% of a protective colloid, said rosin comprising wood rosin whose specific rotation in the solid state has been raised to a value between about +10° and about +15° as the result of having been heated at a temperature between about 280° C. and about 325° C. for from about 5 minutes to about 5 hours, said heat treatment being sufficient to reduce substantially the tendency of the rosin to form 3:1 salt upon subsequent saponification, but insufficient to destroy its crystallizability.

4. A rosin size containing from about 65 to about 92% by weight of free rosin, from about 7 to about 34% by weight of rosin soap, and from about 1 to about 25% of a protective colloid, said rosin comprising wood rosin which has been heat-treated at a temperature between about 250° C. and about 350° C. for from about 5 minutes to about 5 hours, said heat treatment being sufficient to reduce substantially the tendency of the rosin to form 3:1 salt upon subsequent saponification, but insufficient to destroy its crystallizability, said rosin size being characterized by its substantially reduced tendency to foam.

5. A rosin size containing from about 65 to about 92% by weight of free rosin, from about 7 to about 34% by weight of rosin soap, and from about 1 to about 25% of a protective colloid, said rosin comprising wood rosin whose specific rotation in the solid state has been raised to a value between about +5° and about +20° as the result of having been heated at a temperature between about 250° C. and about 350° C. for from about 5 minutes to about 5 hours, said heat treatment being sufficient to reduce substantially the tendency of the rosin to form 3:1 salt upon subsequent saponification, but insufficient to destroy its crystallizability, said rosin size being characterized by its substantially reduced tendency to foam.

6. A rosin size containing from about 65 to about 92% by weight of free rosin, from about 7 to about 34% by weight of rosin soap, and from about 1 to about 25% of a protective colloid, said rosin comprising wood rosin whose specific rotation in the solid state has been raised to a value between about +10° and about +15° as the result of having been heated at a temperature between about 280° C. and about 325° C. for from about 5 minutes to about 5 hours, said heat treatment being sufficient to reduce substantially the tendency of the rosin to form 3:1 salt upon subsequent saponification, but insufficieint to destroy its crystallizability, said rosin size being characterized by its substantially reduced tendency to foam.

7. The method of making a rosin size containing from about 65 to about 92% by weight of free rosin, from about 7 to about 34% by weight of rosin soap and from about 1 to about 25% of a protective colloid, said rosin comprising wood rosin which has been heat-treated at a temperature between about 250° C. and about 350° C. for from about 5 minutes to about 5 hours, said heat treatment being sufficient to reduce substantially the tendency of the rosin to form 3:1 salt upon subsequent saponification, but insufficient to destroy its crystallizability.

8. The method of making a rosin size containing from about 65 to about 92% by weight of free rosin, from about 7 to about 34% by weight of rosin soap and from about 1 to about 25% of a protective colloid, said rosin comprising wood rosin whose specific rotation in the solid state has been raised to a value between about +5° and about +20° as the result of having been heated at a temperature between about 250° C. and about 350° C. for from about 5 minutes to about 5 hours, said heat treatment being sufficient to reduce substantially the tendency of the rosin to form 3:1 salt upon subsequent saponification, but insufficient to destroy its crystallizability.

9. The method of making a rosin size containing from about 65 to about 92% by weight of free rosin, from about 7 to about 34% by weight of rosin soap and from about 1 to about 25% of a protective colloid, said rosin comprising wood rosin whose specific rotation in the solid state has been raised to a value between about +10° and about +15° as the result of having been heated at a temperature between about 280° C. and about 325° C. for from about 5 minutes to about 5 hours, said heat treatment being sufficient to reduce substantially the tendency of the rosin to form 3:1 salt upon subsequent saponification, but insufficient to destroy its crystallizability.

EDMUND A. GEORGI.
ARTHUR L. OSTERHOF.